May 21, 1968
B. F. LATHAM, JR
3,384,460
PRODUCTION OF CARBON BLACK
Filed May 27, 1965
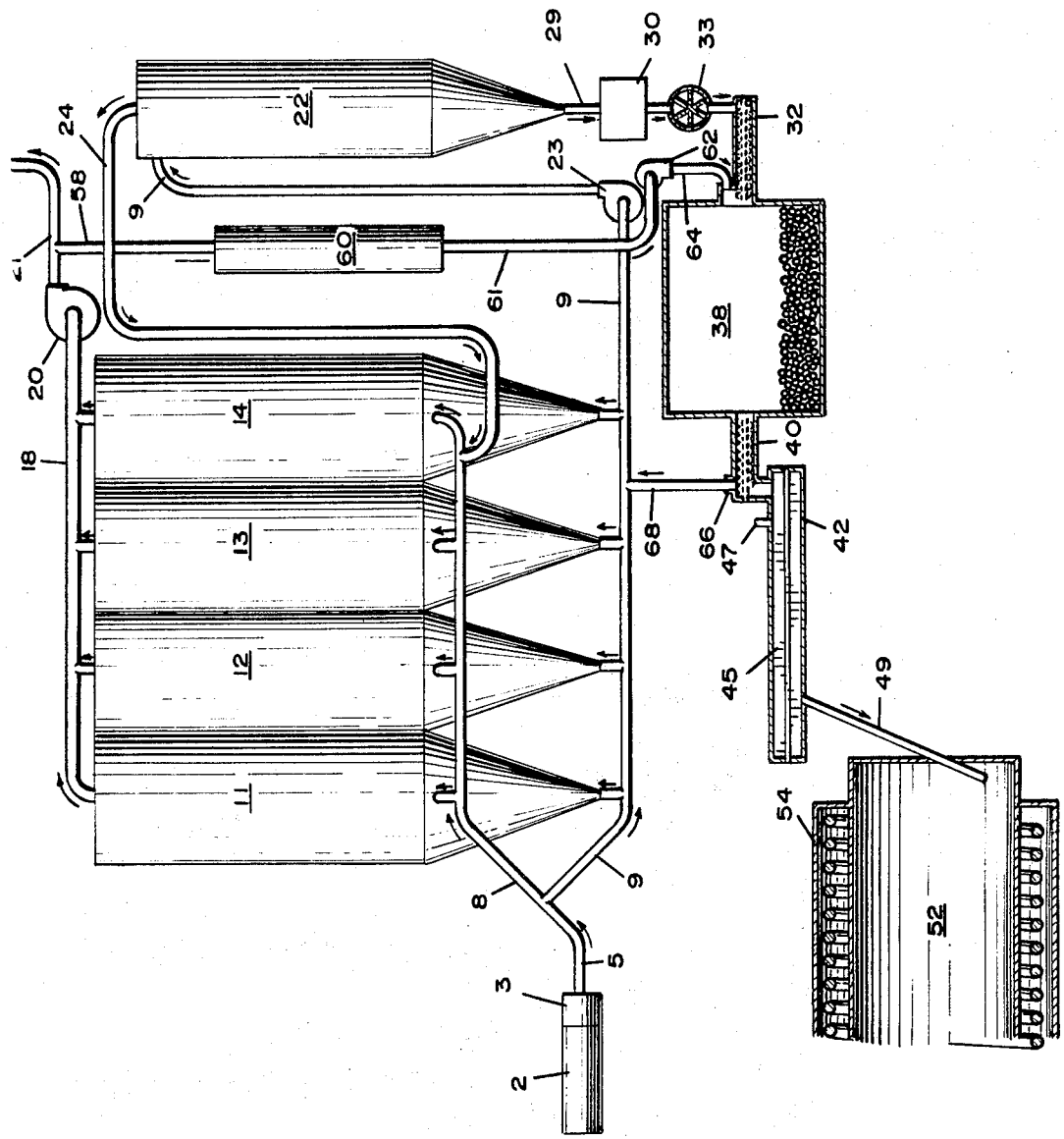
Burton F. Latham, Jr.
INVENTOR
BY L. David Trapnell
ATTORNEY 3,384,460
PRODUCTION OF CARBON BLACK
Burton F. Latham, Jr., Houston, Tex., assignor to Continental Carbon Company, Houston, Tex., a corporation of Delaware
Filed May 27, 1965, Ser. No. 459,311
9 Claims. (Cl. 23—314)

ABSTRACT OF THE DISCLOSURE

Apparatus and process for producing a finished carbon black having reduced structure properties. Carbon black is collected and passed to a grinding mill containing a reducing atmosphere derived as dried reactor effluent gas. The black particles are milled to mechanically reduce the structure of the carbon particles, and the particles are then wet pelletized and dried for conversion to a finished product.

---

This invention relates to the production of carbon black, and more particularly to a process and apparatus wherein particulate carbon black is ground or comminuted while in a reducing or non-oxidizing atmosphere which is composed entirely, or at least for the most part, of carbon black effluent gas.

It is, of course, well known in the art of producing carbon black that both dry pelletized and wet pelletized carbon blacks have decided commercial advantages over carbon black in flocculent form; and for most purposes the wet pelletized form is the most commercially advantageous of all.

It is also known that the chain structure of carbon black particles can be reduced by subjecting the same to the application of mechanical force as by prolonged milling or grinding, such that ball milling for a period of .25 to 6 hours or more will reduce the chain structure of carbon black having an oil absorption of from 1.00 to 2.60 cc./g. to an oil absorption ranging of from between 0.50 to 1.20 cc./g. Also, that grinding or milling carbon black in a normal air atmosphere results in oxidation of the carbon black surface and a reduction of pH from a normal furnace black range of 6.5 to 8.5 to a range of 2.5 to 6.0. A corresponding reduction of cure rates is obtained when such carbon blacks are compounded in rubber formulation due to the adsorption of oxygen bearing radicals on the carbon black surface. While reduction of cure rate is desirable in some natural rubber formulations, it is very undesirable in most synthetic rubber formulations.

The present invention seeks to provide a mechanical reduction of chain structure (by shearing action in a grinding or milling apparatus) while the carbon black is in a reducing, or non-oxidizing, atmosphere, and more particularly cleaned and relatively dry carbon black effluent gas. After grinding or milling in such atmosphere, the carbon black of reduced chain structure is passed to a wet pelletizer and then a drying drum.

In addition to the foregoing advantages economies of operation are effected since no extraneous source of reducing atmosphere is necessitated, and the various individual elements of the apparatus employed are entirely conventional design.

Various additional objects, advantages and features of the invention will become apparent from the following detailed description, taken in conjunction with the accompanying drawings wherein like numerals designate like parts, and wherein The sole figure is a schematic apparatus layout.

Referring more particularly to the drawings, the numeral 2 generally designates a carbon black reactor which may take the form of any of a large number of well known types; the same embodying a quench section 3 at the outlet end thereof.

An outlet pipe 5 communicates with the outlet end of the quench section 3; and this outlet pipe, in turn, communicates through a forked connection with an (upper) outlet conduit 8 and a (lower) pneumatic conveyor 9.

The conduit 8 for the quenched effluent of gas and carbon black has a series of outlets which communicate with the discharge openings of a corresponding series of carbon black collecting devices 11, 12, 13 and 14. These carbon black collecting devices are part of a carbon black collection system which may comprise bag filters, cyclones, electrostatic precipitators, or wet scrubbers; or any combination of such collecting devices.

The effluent gas and water vapor, from which the entrained carbon black is removed in the carbon black collection system, move from the upper portions of the collecting devices 11, 12, 13 and 14 into a cleaned gas conduit 18. A fan 20 draws the cleaned gases from the cleaned gas conduit 18 and passes them through line 21 to a stack or to a waste heat burner (not shown) for disposal.

In communicating with the carbon black and effluent gas outlet pipe 5, the pneumatic conveyor 9 pulls a small fraction of the effluent gas and utilizes it as a motivating or conveyor gas.

The pneumatic conveyor 9 communicates with a conveyor cyclone 22 and contains an intermediately disposed fan 23.

The lower outlet opening of the conveyor cyclone communicates via line 29 with the inlet end of a pulverizer 30, and the discharge end of the pulverizer communicates with a feed screw 32 through an intermediately disposed rotary gas lock 33.

Disposed adjacent the discharge end of the feed screw 32, and communicating therewith, is a ball mill 38 which is adapted to mechanically reduce the chain structure of the carbon black by the grinding or milling action referred to earlier herein. As previously stated, various other grinding media may be employed in lieu of the ball mill 38.

From the ball mill (or other suitable grinding device) 38, the carbon black of mechanically reduced chain structure moves into, and through, a feed screw 40; and then into the inlet end of a wet pelletizing box 42.

The wet pelletizing box 42 is provided with the usual interiorly disposed rotatable pin-shaft agitator 45, as well as a water port 47 adjacent its inlet end.

The wet pellets formed in the wet pelletizing box 42 flow therefrom through a suitable discharge orifice, along a downwardly extending conveyor or guide chute 49 and into a rotatable drying drum 52.

The rotatable drying drum 52 is suitably heated, as by means of a heating jacket 54; and the dried pellets are removed therefrom in any suitable manner.

According to the teachings of the present invention, a line 58 is connected to the cleaned gas line 21, which extends between the fan 20 and the stack or waste heat burner (not shown); and this line 58 communicates with a water-cooled condenser 60 wherein most of the water vapor is removed from the cleaned gas which is furnished thereto. The clean and relatively dry effluent gas is fed from the water-cooled condenser 60 through line 61, small fan 62, and line 64, into the inlet end of the ball mill 38.

The outlet end of the feed screw 40 is provided with a vent 66 which communicates with the pneumatic conveyor 9 through a pipe 68. Thus, there is recycled dry effluent gas remaining from the grinding operation, together with a minor amount of entrained carbon black dust.

Operation

The suspended carbon black is removed from the main stream of the effluent gas in the carbon black collecting system (11, 12, 13 and 14). The loose carbon black, which is well agglomerated, is dropped into the pneumatic conveyor 9 and moved to the conveyor cyclone 22 wherein the agglomerated carbon black is separated and the small portion of conveyor gas recycled, as shown, via line 24 to conduit 8. The loose carbon black passes from the conveyor cyclone 22 through the pulverizer 30, rotary gas lock 33, and feed screw 32 into the rotating carbon black ball mill 38 for the mechanical breaking up of the chain structure.

From the upper portion of the collecting system (11, 12, 13 and 14) the clean gas and water vapor are drawn through clean gas conduit 18 and fan 20 and passed via line 21 to the stack for atmospheric venting or to a waste heat burner. However, a small portion of the clean wet effluent is passed by line 58 to a water-cooled condenser 60 wherein most of the water vapor is removed.

A typical clean effluent gas from the collection system has the following analyses before and after passage to the condenser 60:

| Components | Percent by volume before condenser | Percent by volume after condenser |
|---|---|---|
| $H_2O$ Vapor | 45.0 | 1.0 |
| Nitrogen | 37.0 | 66.6 |
| Hydrogen | 7.5 | 13.5 |
| Carbon Monoxide | 7.2 | 13.0 |
| Carbon Dioxide | 2.5 | 4.5 |
| Acetylene | 0.4 | 0.7 |
| Methane | 0.4 | 0.7 |
| Total | 100.0 | 100.0 |

As earlier stated, the clean relatively dry effluent gas is drawn from the condenser 60 by line 61 through small fan 62 and discharged into inlet end of the ball mill 38 through the line 64; and the vent effluent gas from the ball mill is recycled through the vent 66 and vent pipe 68 to pneumatic conveyor 9, together with any carbon black dust entrainment.

Except for the port which communicates with the pipe 64, the ball mill 38 (or equivalent grinding device) is closed to gaseous media. Since only carbon black effluent gas is introduced through the pipe 64, etc., reducing conditions are maintained throughout the mechanical reduction in chain structure with the accompanying advantages recited earlier herein.

A series of production runs were made in accordance with the teachings hereof utilizing a commercial carbon black reactor equipped with conventional auxiliary apparatus at the following operating conditions. The samples of carbon black were subjected to standard analytical and rubber testing procedures from which the following data have been obtained:

| Run Number | X389A | X389E | X389I |
|---|---|---|---|
| Sample Number | Dev. 2-1 | Dev. 2-5 | Dev. 2-9 |
| Type Carbon Black | HAF | HAF | HAF |
| Operating Data: | | | |
| Combustion Air Rate, s.c.f.h. | 100,000 | 100,000 | 100,000 |
| Air/Gas Ratio | 15/1 | 15/1 | 15/1 |
| Center Air Rate, s.c.f.h. | 10,000 | 10,000 | 10,000 |
| Combustion Air Preheat, °F | None | None | None |
| Feedstock Oil Rate, g.p.h. | 151.1 | 152.3 | 154.2 |
| Feedstock Oil Preheat, °F | 400 | 400 | 400 |
| Ball Mill Feed Rate, lbs./hr | (¹) | 180 | 180 |
| Ball Milling Estimated Time, min. | (¹) | 20 | 20 |
| Ball Milling Atmosphere | (¹) | (²) | (³) |
| Analytical Test Results: | | | |
| Iodine Absorption | 75 | 78 | 76 |
| Oil Absorption | 1.46 | 1.00 | 1.05 |
| Time (IRB Ref. plus 100%) | 102 | 103 | 102 |
| Photrometer | 85 | 84 | 87 |
| pH | 7.8 | 6.2 | 7.7 |

All Results Below Difference from S 3511 Ref. Carbon Black

| Rubber Test Results: | | | |
|---|---|---|---|
| Tensile Strength, p.s.i.: | | | |
| Cure Time: | | | |
| 25 | −200 | +10 | −35 |
| 50 | −145 | −75 | −130 |
| 100 | −110 | −90 | −225 |
| Ultimate Elongation, Percent: | | | |
| Cure Time: | | | |
| 25 | −70 | +30 | −20 |
| 50 | −55 | +40 | 0 |
| 100 | −25 | +45 | +10 |
| Modulus, p.s.i., at 300%: | | | |
| Cure Time: | | | |
| 25 | +340 | −195 | −50 |
| 50 | +335 | −225 | −50 |
| 100 | +155 | −390 | −80 |

¹ Not used.
² Air (oxidizing).
³ Eff. gas (reducing).

Having thus described my invention, what I claim as new and desire to secure by Letters Patent is:

1. A process for producing pelletized carbon black comprising the steps of recovering an effluent stream of hot combustion gas and entrained carbon black particles from a carbon black reactor to a gas-solids separation zone; separating substantially all of said carbon black particles from said stream; withdrawing a portion of the gas separated from said effluent stream; removing substantially all water from said gas so withdrawn; introducing said black particles in the condition as formed in said reactor without prior milling and dried gas to a ball mill; milling said black particles in a reducing atmosphere whereby the chain structure of said black is reduced; passing the milled black particles to a wet pelletizing operation; wet pelletizing said black; and drying the wet carbon black pellets.

2. The process of claim 1 wherein said separated black particles and any foreign material accumulated during said process are passed to a pulverizer prior to introduction to said ball mill, and pulverizing said foreign material for particle size reduction without exerting substantial physical force on said carbon black particles.

3. The process of claim 1 wherein said dried gas with minor amounts of carbon particles is recovered from said ball mill and recirculated to the solids from said gas-solids separation zone.

4. Apparatus for producing pelletized carbon black comprising a carbon black reactor including a quench section; a carbon black collection system; a ball mill adapted to reduce the chain structure of said carbon black; means for providing a closed atmosphere for said carbon black grinding device; means for passing the solids from said carbon black collection system to said ball mill; means for passing a portion of the gas separated from the carbon black in said collection system to a gas drying means and said ball mill; a wet pelletizer; means for passing the milled carbon black particles from said ball mill to said wet pelletizer; means for drying carbon black pellets; and means for passing the pelletized carbon black to said drying means.

5. The apparatus of claim 4 wherein the means for passing a portion of the separated gas to said ball mill includes a water-condenser.

6. The apparatus of claim 4 wherein the means for passing the solids from the carbon black collection system to said ball mill includes a pulverizer adapted to reduce any foreign material in said solids in size without exerting substantial physical force on said black.

7. The apparatus of claim 4 wherein the means for passing the solids from the carbon black collection system to said ball mill includes a cyclone collector.

8. The apparatus of claim 7 including means for recirculating a portion of the gas and entrained carbon black particles from said ball mill to said means for passing solids.

9. The apparatus of claim 5 wherein the means for passing the solids from the carbon black collection system to said ball mill includes both a pulverizer adapted to reduce any foreign material in said solids in size without exerting substantial physical force on said black and a rotary gas lock.

References Cited

UNITED STATES PATENTS

| | | | |
|---|---|---|---|
| 2,695,837 | 11/1954 | Benz | 23—209.1 |
| 3,102,005 | 8/1963 | Dye | 23—314 |
| 3,155,325 | 11/1964 | Austin | 241—18 |
| 3,333,979 | 8/1967 | Milligan | 23—209.1 |

NORMAN YUDKOFF, *Primary Examiner.*

G. P. HINES, *Assistant Examiner.*